United States Patent
Narasimha

(10) Patent No.: US 9,503,538 B2
(45) Date of Patent: Nov. 22, 2016

(54) METHOD AND SYSTEM FOR PROVIDING A VIRTUAL PLATFORM FOR SHARING INFORMATION

(71) Applicant: TELIBRAHMA CONVERGENT COMMUNICATIONS PVT. LTD., Bangalore (IN)

(72) Inventor: Suresh Narasimha, Bangalore (IN)

(73) Assignee: TELIBRAHMA CONVERGENT COMMUNICATIONS PVT. LTD., Bangalore (IN)

( * ) Notice: Subject to any disclaimer, the term of this patent is extended or adjusted under 35 U.S.C. 154(b) by 414 days.

(21) Appl. No.: 13/939,404

(22) Filed: Jul. 11, 2013

(65) Prior Publication Data
US 2014/0019547 A1    Jan. 16, 2014

(51) Int. Cl.
G06F 15/16 (2006.01)
H04L 29/08 (2006.01)
H04W 4/20 (2009.01)
H04W 84/12 (2009.01)

(52) U.S. Cl.
CPC .............. *H04L 67/22* (2013.01); *H04W 4/206* (2013.01); *H04W 84/12* (2013.01)

(58) Field of Classification Search
CPC ............................. H04W 4/206; H04L 67/22
See application file for complete search history.

(56) References Cited

U.S. PATENT DOCUMENTS

| | | | | |
|---|---|---|---|---|
| 7,571,121 B2* | 8/2009 | Bezos | ............... | G06F 17/30867 705/14.53 |
| 2003/0158897 A1* | 8/2003 | Ben-Natan | .............. | H04L 29/06 709/204 |
| 2008/0113674 A1* | 5/2008 | Baig | ....................... | G06Q 10/10 455/456.3 |
| 2012/0054646 A1* | 3/2012 | Hoomani | ................ | A63F 13/12 715/758 |
| 2015/0012332 A1* | 1/2015 | Papachristos | ......... | H04L 67/125 705/7.29 |

* cited by examiner

Primary Examiner — Yves Dalencourt
(74) Attorney, Agent, or Firm — Barry Choobin; Patent 360 LLC

(57) ABSTRACT

A method and system for providing a virtual platform for sharing information is disclosed. The method for providing virtual platform comprises deploying a hotspot system at a hotspot access point, identifying one or more users at the hotspot access point, determining identification information associated with a user device, establishing a connection between the user device and the hotspot system and providing a virtual platform for sharing information on successful identification of the user device. The hotspot tracks the user activities, identifies user specific attributes based on the user activities, generates one or more communities for the user based on the user specific attributes, sends notifications to the one or more users of similar attributes to join the community and creates a virtual platform for providing interactive information sharing.

13 Claims, 3 Drawing Sheets

METHOD AND SYSTEM FOR PROVIDING A VIRTUAL PLATFORM FOR SHARING INFORMATION

CROSS-REFERENCE TO RELATED APPLICATIONS

The present application claims priority of Indian provisional application serial number 2343/CHE/2012, filed on 13 Jul. 2012 and that application is incorporated in its entirety at least by reference.

BACKGROUND

Technical Field

The embodiments herein generally relates to a networked platform for creating and managing communities and particularly relates to a method and system for automatically creating a community of users having similar interests, based on the user attributes through a mobile device.

Description of the Related Art

Mobile devices have become ubiquitous in today's society. Many people use mobile devices such as personal digital assistants (PDAs), laptops, tablet devices or any smart device to plan their daily lives. These devices grant people the opportunity to connect with others in ways not possible before.

However, despite the advances in technology, connecting with others who share common interests remains difficult. A user must first locate one or more other people who share common interests. The user device will not be able to do of its own, or to help the user in any significant way. The user then needs to search online services for groups sharing the same interests. Even if the user manages to somehow find a group of people who shares common interests, interacting with the group is difficult with conventional technology. These groups are generally limited to interacting via fixed landline devices, over the Internet, with limited access to information with their community in a mobile context. This prevents a user from making full use of the advantages offered by mobile networks and associated mobile devices.

Present technology also presents difficulties for people wishing to interact across platforms. Applications running on mobile devices, personal computers, or Internet protocol enabled entertainment devices (such as IP-enabled digital video recorders) operate using different platforms and protocols. It is difficult for a user using one platform or application to interact with other users or other applications on different platforms. Also, conventional methods do not permit a user to interact seamlessly with others users across a network.

One of the existing prior arts provides a method of creating communities based on the user-attributes. The communities are created by taking input such as document, user-interest keywords etc from the users. Thus the prior art creates a virtual online community of likeminded people but does not discuss about automatically identifying user attributes through the mobile device. The prior art also does not provide notifications about matching communities to the user.

Another prior art provides a system and method for defining eligibility criteria for online communities and also notifying the user whenever they meet or match the criteria. But again, the prior art does not discusses about automatically identifying the attributes based on the location and usage of the mobile device by the user.

Another prior art provides a system and method for integrating online promotions/campaigns with social networks. More specifically, it enables organizations to run promotions that are integrated with the viral features of social networks. The social network-based platform provides viral features, such as the invite friends feature, newsfeeds, mini-feeds, notifications, requests, and an indication of a user's selected applications on the user's social network profile page that advertise and spread the word about the promotion and the organization. But again, the prior art does not discusses about virtual platform for providing different kinds of offers pertaining to a particular merchant at a particular location, number of users active at any moment of time and activities going on at that particular location.

Hence, there is a need for a method and system for creating communities by identifying common attributes between a plurality of people. There is also a need for a method and system for creating a community based on the location and identified attributes of the user through a mobile device. Further there is a need for a method and system for creating a virtual platform for providing interactive information sharing among the users.

The abovementioned shortcomings, disadvantages and problems are addressed herein and which will be understood by reading and studying the following specification.

SUMMARY

The primary object of the embodiments herein is to provide a method and system for automatically creating a user-interest community, based on a location and identified attributes of the user through a mobile device.

Another object of the embodiments herein is to provide a system for monitoring or tracking the user's mobile device at various public places, which are linked to each other through a communication network.

Yet another object of the embodiments herein is to provide a method and system for creating a community for starting a campaign, allowing the user to search for specific communities and providing interactive experience to the user.

Yet another object of the embodiments herein is to provide a virtual platform specific to a particular location to display all relevant contents or topics with respect to a particular location.

These and other objects and advantages of the present embodiments will become readily apparent from the following detailed description taken in conjunction with the accompanying drawings.

The various embodiments of the present disclosure provide a method and system for providing a virtual platform for sharing information. The method for providing virtual platform comprises the steps of deploying a hotspot system at a hotspot access point, identifying one or more users at the hotspot access point, determining identification information associated with a user device, establishing a connection between the user device and the hotspot system and providing virtual platform for sharing information on successful identification of the user device.

According to an embodiment of the present disclosure, after successful identification of the user device, the hotspot system performs tracking of the user activities, identifying user specific attributes based on the user activities, generating one or more communities for the user based on the user specific attributes, sending notifications to one or more users of similar attributes to join the community and creating a virtual platform for providing interactive information sharing.

According to an embodiment of the present disclosure, the method for providing virtual platform further comprises the steps of allowing one or more users to create a community for starting a campaign, allowing user to search for specific communities and providing interactive experience to the user by allowing a plurality of users to join a specific community for any desired communication within the community.

According to an embodiment of the present disclosure, the hotspot access point is one of a vendor outlet, a merchant store, a shopping mall, a restaurant, theaters, bus stops, railway stations and the like.

According to an embodiment of the present disclosure, the user accesses the virtual platform by connecting to the hotspot system at a particular hotspot access point or choosing a preferred hotspot access point remotely.

According to an embodiment of the present disclosure, the user logins to the virtual platform through one of a client application installed in the user device or through an internet browser.

According to an embodiment of the present disclosure, the virtual platform is adapted for providing information or relevant contents associated with the hotspot access point, offers pertaining to one or more merchants at the hotspot access point, number of users active at a point of time, activities going on at the hotspot access point and notifications pertaining to at least one of a new posts, promotions and advertisements related to a brand.

According to an embodiment of the present disclosure, the virtual platform is further adapted for enabling one or more users to post any topic on the virtual platform, start a discussion on the posted topic with other users, reply back on any other posts, promote contents posted in the virtual platform and share any post with other users of the virtual platform and externally though social networking media.

According to an embodiment of the present disclosure, the hotspot system accesses the user devices at the hotspot access point through a router device for identifying the user specific attributes.

Embodiments herein further provide a system for providing a virtual platform for sharing information. The system comprises a hotspot system deployed at a hotspot access point for tracking users, one or more mobile devices with internet connecting capability, a device capable of providing internet communication and a central server for storing the user attributes and hotspot access point details.

According to an embodiment of the present disclosure, the hotspot system is adapted for tracking the user activities, identifying user specific attributes based on the user activities, generating one or more communities dynamically for a user based on the user specific attributes, matching a first user attributes with a second user attribute, joining the first user and the second in a single community and sends notification to each one of them and creating a virtual platform for providing interactive information sharing.

According to an embodiment of the present disclosure, the hotspot system deployed at one or more hotspot access points are interconnected to each other to form a network of hotspot systems.

According to an embodiment of the present disclosure, the hotspot system enables a user to create a community for starting a campaign, search for specific communities and join to specific user communities for any desired communication.

According to an embodiment of the present disclosure, the hotspot system further comprises a processor for processing the user specific attributes extracted from the user mobile devices, a transmitter for providing notifications and community search results to the user and a receiver for receiving information relating to the tracked or monitored mobile device of the user.

According to an embodiment of the present disclosure, the transmitter of the hotspot systems provides notifications comprising a Push message and a SMS to the user.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the present embodiments are shown in some drawings and not in others. This is done for convenience only as each feature may be combined with any or all of the other features in accordance with the present embodiments.

DETAILED DESCRIPTION OF THE DRAWINGS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1:
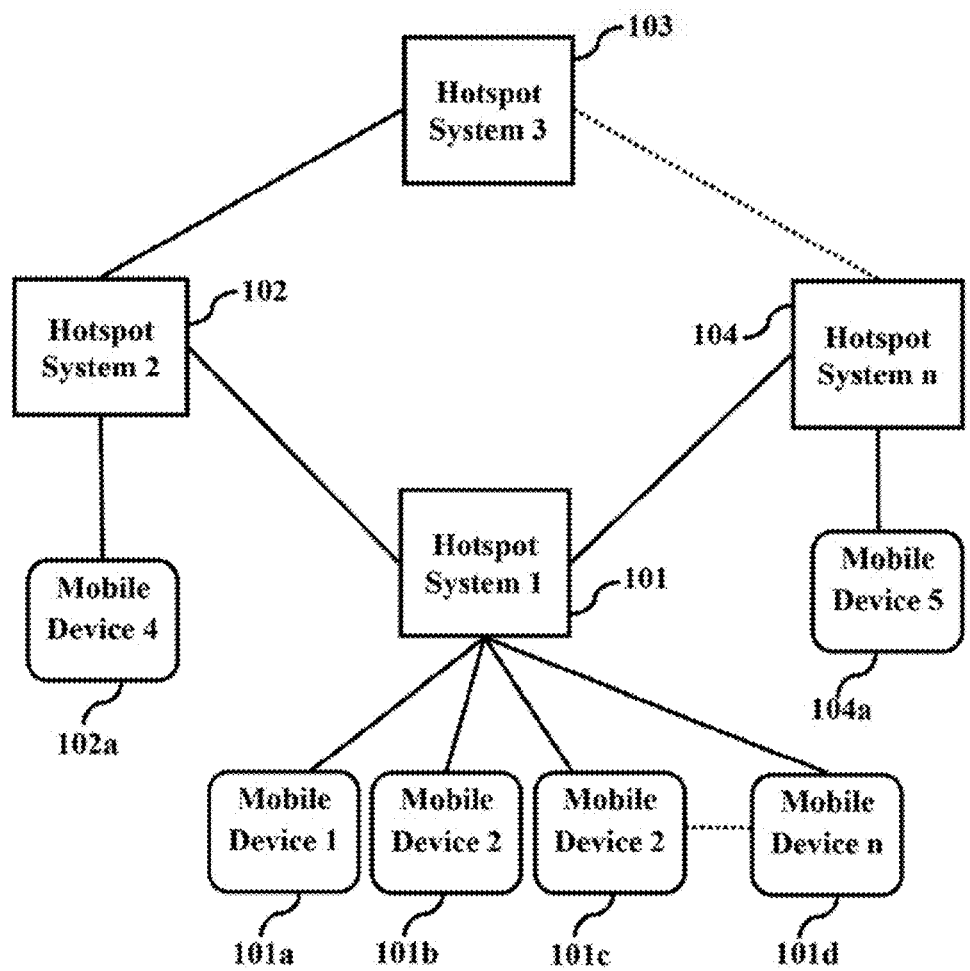
FIG. 1 is a block diagram illustrating a system for providing a virtual platform for sharing information, according to an embodiment of the present disclosure.

FIG. 1 is a block diagram illustrating a system for providing a virtual platform for sharing information, according to an embodiment of the present disclosure.

The system comprises one or more hotspot systems 101, 102 103 and 104 deployed at one or more hotspot access points for tracking users, one or more mobile devices (101a, 101b, 101c, 101d, 102a and 104a) with internet connecting capability, a device capable of providing internet communication (not shown in FIG. 1) and a central server (not shown in FIG. 1) for storing the user attributes and hotspot access point details. The hotspot systems (101, 102 103 and 104) are adapted for tracking the user activities, identifying user specific attributes based on the user activities, generating one or more communities dynamically for a user based on the user specific attributes, matching a first user attribute with a second user attribute, joining the first user and the second user in a single community, sending notification to each one of them and creating a virtual platform for providing interactive information sharing. The hotspot system (101, 102 103 and 104) deployed at one or more hotspot access points are interconnected to each other to form a network of hotspot systems as shown in FIG. 1. The hotspot systems (101, 102 103 and 104) enables a user to create a community for starting a campaign, search for specific communities and join to specific user communities for any desired communication.

According to an embodiment of the present disclosure, the hotspot systems (101, 102 103 and 104) further comprises a processor for processing the user specific attributes extracted from the user mobile devices (101a, 101b, 101c, 101d, 102a and 104a), a transmitter for providing notifications and community search results to the user and a receiver for receiving information relating to the tracked or monitored mobile devices (101a, 101b, 101c, 101d, 102a and 104a) of the user. The transmitter of the hotspot systems (101, 102 103 and 104) provides notifications such as but not limited to a Push message and a SMS to the user.

Figure 2:
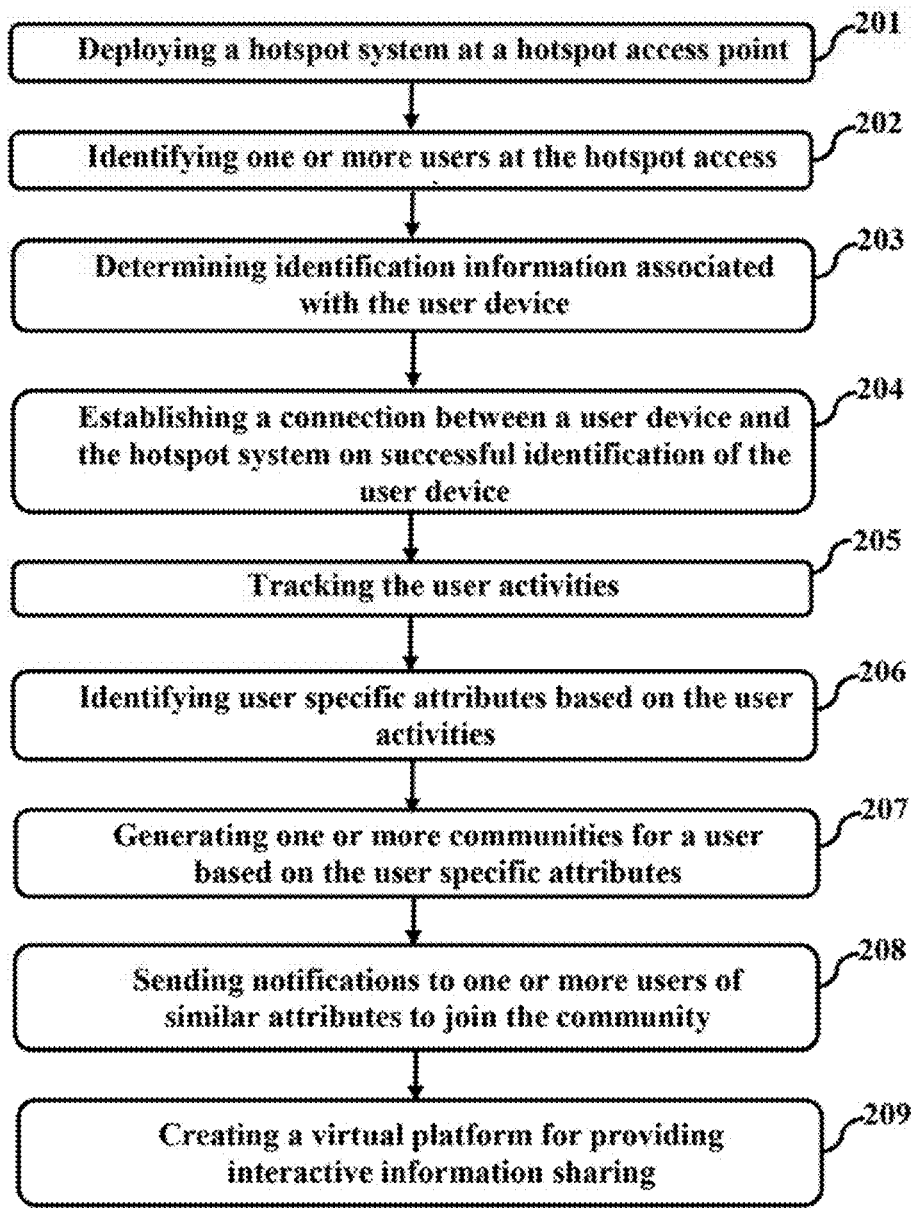
FIG. 2 is a flow chart illustrating a method for providing a virtual platform for sharing information, according to an embodiment of the present disclosure.

FIG. 2 is a flow chart illustrating a method for providing a virtual platform for sharing information, according to an embodiment of the present disclosure. The method comprises deploying a hotspot system at a hotspot access point 201, identifying one or more users at the hotspot access point 202, determining identification information associated with the user device 203, establishing a connection between a user device and the hotspot system on successful identification of the user device 204, tracking the user activities 205, identifying user specific attributes based on the user activities 206, generating one or more communities for a user based on the user specific attributes 207, sending notifications to one or more users of similar attributes to join the community 208 and creating a virtual platform for providing interactive information sharing 209.

According to an embodiment herein, the method further allows one or more users to create a community for starting a campaign, allows the user to search for specific communities and provide interactive experience to the user by allowing a plurality of users to join a specific community for any desired communication within the community.

According to an embodiment herein, the hotspot access point is one of a vendor outlet, a merchant store, a shopping mall, a restaurant, theaters, bus stops, railway stations and the like. The user accesses the virtual platform by connecting to the hotspot system at a particular hotspot access point or choosing a preferred hotspot access point remotely. The user logins to the virtual platform through one of a client application installed in the user device or through an internet browser. The hotspot system accesses the user devices at the hotspot access point through a router device for identifying the user specific attributes.

According to an embodiment herein, the virtual platform is adapted for providing information or relevant contents associated with the hotspot access point, offers pertaining to one or more merchants at the hotspot access point, number of active users at a point of time, activities going on at the hotspot access point, notifications pertaining to at least one of a new posts and promotions and advertisements related to a brand. The virtual platform enables one or more users to post any topic on the virtual platform, start a discussion on the posted topic with other users, reply back on any other posts, promote contents posted in the virtual platform and share any post with other users of the virtual platform and externally though social networking media.

Figure 3:
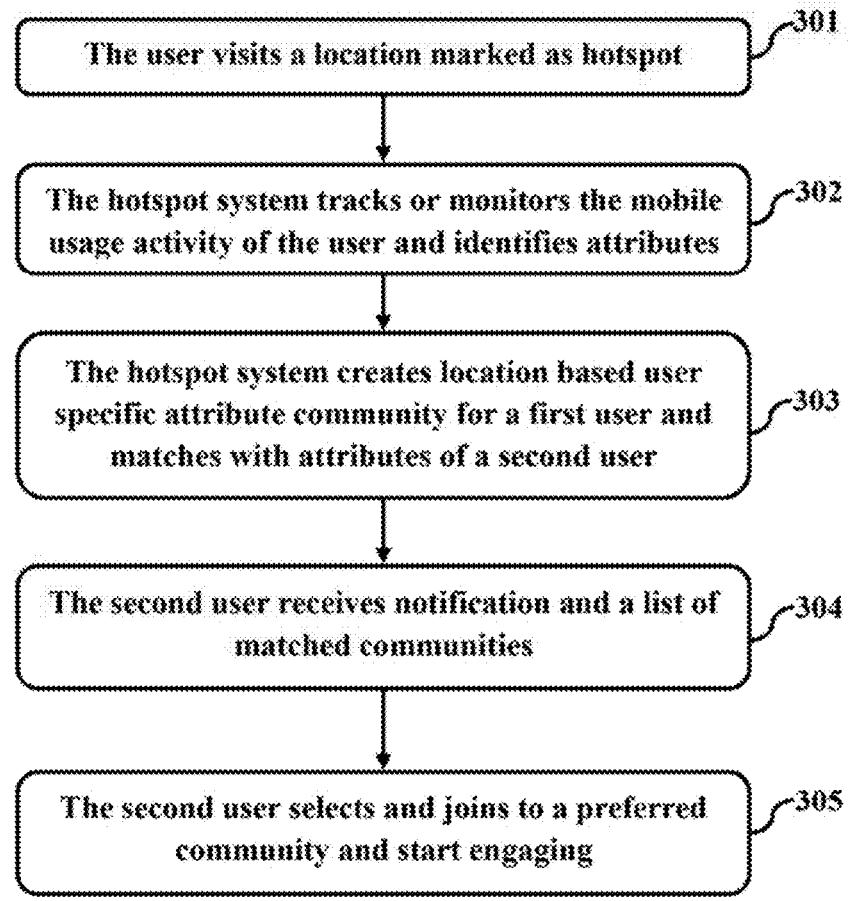
FIG. 3 is a flow chart illustrating a method of engaging a first user with a second user of a preferred community, according to an embodiment of the present disclosure.

FIG. 3 is a flow chart illustrating a method of engaging a first user with a second user of a preferred community, according to an embodiment of the present disclosure. The user visits a public place. The public place is installed with a system for monitoring or tracking a user's mobile device, herein referred as a hotspot system (301). The user connects to the hotspot system by a mobile device (such as tablet, Smartphone, laptops, tablets etc.) through the wireless communication network. The hotspot system tracks/monitors the usage statistics of the user mobile device and identifies certain user specific attributes (302). The hotspot system combines the identified attributes with the location details of the user and creates a community. The hotspot system then matches a second user attributes with the created community attributes (303). If the attributes match with each other, the hotspot system notifies to the second user with a list of matched communities (304). If the attributes does not match, then the hotspot system creates another community for a second user. The second user receives the list of communities in the mobile device and joins a preferred community. The second user is now able to interact and communicate with the first user as well as other users of the same community (305).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification.

What is claimed is:

1. A method for providing a virtual platform for sharing information, the method comprises:
   deploying a hotspot system at a hotspot access point;
   identifying one or more users at the hotspot access point;
   determining an identification information associated with a user device;
   establishing a connection between the user device and the hotspot system on successful identification of the user device;
   tracking, the user activities;
   identifying user specific attributes based on the user activities;
   generating one or more communities for a user based on the user specific attributes and location;
   sending notifications to one or more users of similar attributes to join the community and
   creating a virtual platform for providing interactive information sharing;
   wherein a first user attributes is matched with a second user attribute, and wherein the second user attribute is matched with attributes of created community, and wherein the second user is notified with a list of matched communities, when the attributes of the second user matches with each other, wherein the first user and the second user are joined in a single community and notification is sent to each one of them, and wherein another community is created for the second user, when the attributes do not match, and wherein the second user receives the list of communities and joins a preferred community thereby enabling the second user to interact with the first user and as well as other users of same community.

2. The method of claim 1, further comprises:

allowing one or more users to create a community for starting a campaign;

allowing the one or more user search for a specific community; and providing an interactive experience to the users by allowing a plurality of users to join a specific community for any desired communication within the community.

3. The method of claim 1, wherein the hotspot access point is one of a vendor outlet, a merchant store, a shopping mall, a restaurant, theatres, bus stops or railway station.

4. The method of claim I, wherein the user accesses the virtual platform by connecting to the hotspot system at a particular hotspot access point or choosing a preferred hotspot access point remotely.

5. The method of claim 1, wherein the user logins to the virtual platform through one of a client application installed in the user device or an intern browser.

6. The method of claim 1, wherein the virtual platform is configured for providing at least one of:

relevant contents associated with the hotspot access point;

offers pertaining to one or more merchants at the hotspot access point;

number of active users at a point of time;

activities going on at the hotspot access point; and notifications pertaining to at least one of a new posts, promotions and advertisements related to a brand.

7. The method of claim 1 wherein the virtual platform is further configured for enabling one or more users to:

post a topic of interest on the virtual platform;

start a discussion on the posted topic with other users;

reply back on topics posted by other users;

promote contents posted in the virtual platform; and share posts with other users of the virtual platform and externally through social networking media.

8. The method of claim 1, wherein the hotspot system accesses the user devices at the hotspot access point through a router device for identifying the user specific attributes.

9. A system for creating a virtual platform for sharing information, the system comprising:

a hotspot system deployed at a hotspot access point for tracking one or more users;

one or more mobile devices with an internet connecting capability;

a device configured for providing internet communication; and a central server for storing the user attributes and hotspot access point details;

wherein the hotspot system is configured for;

tracking the user activities;

identifying one or more user specific attributes based on the user activities;

generating one or more communities dynamically for a user based on the user specific attributes and location details;

matching a first user attributes with a second user attribute;

joining the first user and the second user in a single community and sends notification to each one of them: and creating a virtual platform for providing interactive information sharing, wherein the second use attribute is matched with attributes of created community, and wherein the second user is notified with a list of matched communities, when the attributes of the second user matches with each other, wherein the first user and the second user are joined in a single community and notification is sent to each one of them, and wherein another community is created for the second user, when the attributes do not match, and wherein the second user receives the list of communities and joins a preferred community thereby enabling the second user to interact with the first user and as well as other users of same community.

10. The system of claim 9, wherein a plurality of hotspot systems deployed at one or more hotspot access points are interconnected to each other to form a network of hotspot systems.

11. The system of claim 9, wherein the hotspot system enables a user to:

create a community tier starting a campaign;

search the specific communities; and join to specific user communities for any desired communication.

12. The system of claim 9, wherein the hotspot system further comprising:

a processor for processing the user specific attributes extracted from the user mobile devices;

a transmitter tor providing notifications and community search results to the user; and a receiver for receiving information relating to the tracked or monitored mobile device of the user.

13. The system of claim 9, wherein the transmitter of the hotspot systems provides notifications comprising a Push message and a SMS to the user.

* * * * *